(12) United States Patent
Sato et al.

(10) Patent No.: US 10,644,311 B2
(45) Date of Patent: May 5, 2020

(54) POSITIVE ELECTRODE ACTIVE MATERIAL AND ALKALINE BATTERY

(71) Applicants: TOYOTA JIDOSHA KABUSHIKI KAISHA, Toyota-shi, Aichi (JP); TANAKA CHEMICAL CORPORATION, Fukui-shi, Fukui (JP)

(72) Inventors: Shigeki Sato, Fujinomiya (JP); Makio Kon, Mishima (JP); Mikio Hata, Fukui (JP); Taiki Yasuda, Fukui (JP)

(73) Assignees: TOYOTA JIDOSHA KABUSHIKI KAISHA, Toyota-shi, Aichi-ken (JP); TANAKA CHEMICAL CORPORATION, Fukui-shi, Fukui (JP)

( * ) Notice: Subject to any disclaimer, the term of this patent is extended or adjusted under 35 U.S.C. 154(b) by 53 days.

(21) Appl. No.: 15/773,632

(22) PCT Filed: Nov. 7, 2016

(86) PCT No.: PCT/JP2016/083004
§ 371 (c)(1),
(2) Date: May 4, 2018

(87) PCT Pub. No.: WO2017/078179
PCT Pub. Date: May 11, 2017

(65) Prior Publication Data
US 2019/0067687 A1 Feb. 28, 2019

(30) Foreign Application Priority Data
Nov. 6, 2015 (JP) .................... 2015-218900

(51) Int. Cl.
*H01M 4/36* (2006.01)
*H01M 4/52* (2010.01)
(Continued)

(52) U.S. Cl.
CPC ............ *H01M 4/366* (2013.01); *C01G 51/04* (2013.01); *C01G 51/40* (2013.01); *C01G 53/006* (2013.01);
(Continued)

(58) Field of Classification Search
CPC ...... C01G 51/04; C01G 51/40; C01G 53/006; C01G 53/70; C01P 2002/72;
(Continued)

(56) References Cited

U.S. PATENT DOCUMENTS 6,265,105 B1    7/2001  Tokuda et al.
2001/0044048 A1* 11/2001  Ogasawara ............. H01M 4/32
                                                        429/223
(Continued)

FOREIGN PATENT DOCUMENTS

JP    11-185746 A    7/1999
JP    2000-67910 A   3/2000
(Continued)

OTHER PUBLICATIONS

Scientific and Technical Information Center (STIC) search results by Rachel Kahelin (Year: 2019).*
Machine Translation JP2003249214A (Year: 2003).*

*Primary Examiner* — Robert S Jones
*Assistant Examiner* — Victoria H Lynch
(74) *Attorney, Agent, or Firm* — Sughrue Mion, PLLC

(57) ABSTRACT

An objective of the present invention is to provide a positive electrode active material that can inhibit the capacity changes associated with temperature variations, and an alkaline battery that contains this positive electrode active material. Aluminum and ytterbium are at least partially solid-dissolved in nickel hydroxide in the nickel composite hydroxide present in the positive electrode active material of the present invention.

6 Claims, 4 Drawing Sheets

(51) Int. Cl.
*C01G 53/00* (2006.01)
*C01G 51/04* (2006.01)
*C01G 51/00* (2006.01)
*H01M 10/30* (2006.01)
*H01M 4/02* (2006.01)

(52) U.S. Cl.
CPC .............. C01G 53/70 (2013.01); H01M 4/52 (2013.01); *C01P 2002/72* (2013.01); *C01P 2004/03* (2013.01); *C01P 2004/61* (2013.01); *C01P 2004/84* (2013.01); *C01P 2006/40* (2013.01); *H01M 10/30* (2013.01); *H01M 2004/028* (2013.01)

(58) Field of Classification Search
CPC .............. C01P 2004/03; C01P 2004/61; C01P 2004/84; C01P 2006/40; H01M 10/30; H01M 2004/028; H01M 4/366; H01M 4/52
See application file for complete search history.

(56) References Cited

U.S. PATENT DOCUMENTS

| | | | |
|---|---|---|---|
| 2010/0143767 A1* | 6/2010 | Wang | C08G 73/122 429/483 |
| 2014/0093776 A1 | 4/2014 | Kakeya et al. | |
| 2014/0106228 A1 | 4/2014 | Toya et al. | |
| 2015/0357638 A1 | 12/2015 | Sun et al. | |

FOREIGN PATENT DOCUMENTS

| | | | | |
|---|---|---|---|---|
| JP | 2001-297759 A | | 10/2001 | |
| JP | 2003-249214 A | | 9/2003 | |
| JP | 2003249214 A | * | 9/2003 | ............ H01M 10/30 |
| JP | 2014-199798 A | | 10/2014 | |
| KR | 10-2014-0008445 A | | 1/2014 | |
| KR | 10-2014-0099218 A | | 8/2014 | |

* cited by examiner

POSITIVE ELECTRODE ACTIVE MATERIAL AND ALKALINE BATTERY

CROSS REFERENCE TO RELATED APPLICATIONS

This application is a National Stage of International Application No. PCT/JP2016/083004 filed Nov. 7, 2016, claiming priority based on Japanese Patent Application No. 2015-218900, filed Nov. 6, 2015.

FIELD

The present invention relates to a positive electrode active material and an alkaline battery.

BACKGROUND

The nickel hydroxide widely used as a positive electrode active material in alkaline batteries typically undergoes an oxidation-reduction reaction between β-type nickel hydroxide (also referred to as β-Ni(OH)$_2$ in which the valence of Ni is 2) and β-type nickel oxyhydroxide (also referred to as β-NiOOH in which the valence of Ni is 3), and discharging and charging of the battery takes place as a result thereof. This oxidation-reduction reaction can be represented with the reaction formula indicated below.

$\beta\text{-Ni(OH)}_2 + \text{OH}^- \Leftrightarrow \beta\text{-NiOOH} + \text{H}_2\text{O} + e^-$ The oxidation-reduction reaction represented by the aforementioned reaction formula is reversible. Namely, in this reaction formula, the reaction that proceeds from left to right constitutes charging, while the reaction that proceeds from right to left constitutes discharging. In addition, this reaction is a one-electron transfer reaction, and the theoretical capacity is known to be 289 mAh/g.

In contrast, attention is currently being focused on the oxidation-reduction reaction that occurs between α-type nickel hydroxide (also referred to as α-Ni(OH)$_2$ in which Ni has a valence of 2) and γ-type nickel oxyhydroxide (also referred to as γ-NiOOH in which Ni has a valence of 3). This reaction is a multi-electron reaction and what is more, since it is possible for the theoretical capacity of this reaction to be at least 1.5 times greater than or equal to the theoretical capacity of the aforementioned reaction, this reaction makes it possible to realize higher battery capacity.

However, α-type nickel hydroxide is comparatively unstable and thus, is easily converted to β-type nickel hydroxide in an alkaline solution.

Moreover, a reaction is also known to occur between β-type nickel hydroxide and γ-type nickel oxyhydroxide. However, the use of this reaction is not preferable due to the difficulty in allowing the oxidation-reduction reaction to proceed reversibly and the occurrence of fluctuations in volume of the nickel hydroxide attributable to differences in the structures of these nickel hydroxides.

Thus, studies have been conducted on an ca-type nickel hydroxide capable of demonstrating a high level of stability under conditions such as being placed in an aqueous alkaline solution.

The sealed alkaline zinc storage battery of Patent Document 1 uses nickel hydroxide for the positive electrode active material, and at least one type of element selected from manganese (Mn), aluminum (Al), cobalt (Co), yttrium (Y), ytterbium (Yb), erbium (Er) and gadolinium (Gd) is solid-dissolved in this nickel hydroxide.

The alkaline battery of Patent Document 2 contains an active material consisting mainly of α-type nickel hydroxide (α-Ni(OH)$_2$), and a hydroxide and/or oxyhydroxide containing at least one element selected from erbium (Er), trillium (Tm), ytterbium (Yb) and lutetium (Lu).

The positive electrode material for an alkaline battery of Patent Document 3 is Al-substituted Ni(OH)$_2$. This Al-substituted Ni(OH)$_2$ is represented by the formula (Al$_x$Ni$_{1-x}$)(OH)$_2$Y (wherein, x represents a value from 0.15 to 0.3 and Y represents an anion), and is characterized by the d value of the (003) diffraction peak in an X-ray diffraction diagram being less than 8.2 Å.

Furthermore, in the positive electrode material for an alkaline battery of Patent Document 4, solid solution particles consisting mainly of nickel hydroxide are coated with cobalt oxide obtained by putting into solid solution at least one type of metal selected from alkaline earth metals and transition metals having cobalt hydroxide for the main component thereof. In the positive electrode active material for an alkaline battery of Patent Document 4, the cobalt oxide is oxidized electrochemically when a battery employing this active material is charged, and an electrically conductive network is formed by a plurality of solid solution particles, resulting in improvement of the utility factor of the active material in the battery.

PRIOR ART DOCUMENTS

Patent Documents

Patent Document 1: Japanese Unexamined Patent Publication No. 2000-067910
Patent Document 2: Japanese Unexamined Patent Publication No. 2003-249214
Patent Document 3: Japanese Unexamined Patent Publication No. H11-185746
Patent Document 4: Japanese Unexamined Patent Publication No. 2001-297759

DISCLOSURE OF THE INVENTION

Problems to be Solved by the Invention

One of the objects of the sealed alkaline zinc storage battery of Patent Document 1, the alkaline battery of Patent Document 2, and the positive electrode material for an alkaline battery of Patent Document 3 is to provide an α-type nickel hydroxide having a high level of stability. However, a battery using these α-type nickel hydroxides as a positive electrode active material has the potential to undergo a change in capacity accompanying a change in temperature.

Thus, an object of the present invention is to provide a positive electrode active material capable of inhibiting changes in capacity accompanying changes in temperature, and an alkaline battery containing this positive electrode active material.

Means for Solving the Problems

The inventors of the present invention found that the aforementioned problem can be solved by employing the means indicated below.

<1> A positive electrode active material containing a nickel composite hydroxide in which aluminum and ytterbium are at least partially solid-dissolved in nickel hydroxide.

<2> The positive electrode active material described in <1>, wherein the nickel composite hydroxide is represented by the following formula (I):

$$Ni_aAl_bYb_c(OH)_d \quad (I)$$

(wherein,
a+b+c=1.00,
0.70≤a<1.00,
0<b≤0.2,
0<c≤0.1, and
d=2a+3b+3c).

<3> The positive electrode active material described in <1> or <2>, wherein the nickel composite hydroxide further contains a coating layer with which it is covered, and the coating layer contains cobalt.

<4> The positive electrode active material described in <3>, wherein the coating layer further contains at least one type of element selected from the group consisting of aluminum, manganese and nickel.

<5> The positive electrode active material described in <4>, wherein the coating layer contains manganese and nickel.

<6> A positive electrode containing the positive electrode active material described in any of <1> to <5>.

<7> An alkaline battery containing the positive electrode active material described in any of <1> to <5> or the positive electrode described in <6>.

Effects of the Invention

According to the present invention, a positive electrode active material capable of inhibiting changes in capacity accompanying a change in temperature, and an alkaline battery containing that positive electrode active material, can be provided.

EMBODIMENTS FOR CARRYING OUT THE INVENTION

Figure 1:
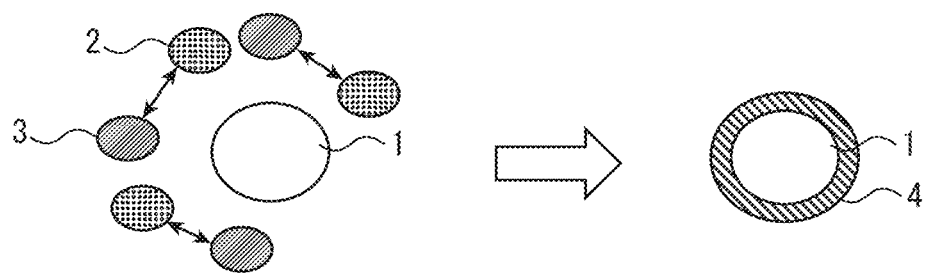
FIG. 1 is a schematic diagram showing a step for forming a coating layer containing cobalt and the like on a nickel composite hydroxide.

The following provides a detailed explanation of embodiments of the present invention. Furthermore, the present invention is not limited to the following embodiments, but can be modified in various ways within the scope of the gist of the present invention.

The inventors of the present invention conducted extensive studies on positive electrode active materials in the form of nickel hydroxides capable of demonstrating stable capacity without being affected by changes in battery temperature. As a result, the inventors of the present invention found that the use of a nickel composite hydroxide, in which at least a plurality of specific elements are partially solid-dissolved in nickel hydroxide, as a positive electrode active material, and a battery installed with this positive electrode material, undergo hardly any change in the capacity thereof in the case the battery temperature has changed. The positive electrode active material of the present invention is described below.

<<Positive Electrode Active Material>>

Aluminum and ytterbium are at least partially solid-dissolved in nickel hydroxide in the nickel composite hydroxide contained in the positive electrode active material of the present invention.

This nickel composite hydroxide is able to inhibit changes in capacity accompanying temperature changes.

Furthermore, in the present invention, a "nickel composite hydroxide" refers to a hydroxide in which at least one type of metal element is at least partially solid-dissolved in nickel hydroxide. Thus, for example, a "nickel composite hydroxide" may be a nickel hydroxide not only having a portion in which at least one type of metal element is solid-dissolved in nickel hydroxide, but also a portion in which nickel hydroxide and a hydroxide of at least one type of metal element are each present independently.

Moreover, the nickel composite hydroxide contained in the positive electrode active material of the present invention can be represented by the following formula (I):

$$Ni_aAl_bYb_c(OH)_d \quad (I)$$

(wherein,
a+b+c=1.00,
0.70≤a<1.00,
0<b≤0.2,
0<c≤0.1, and
d=2a+3b+3c).

Furthermore, a, b, c and d in the aforementioned formula (I) represent molar ratios. Thus, the condition of "a+b+c=1.00" in the aforementioned formula (I) means that the total of the molar ratios of a, b and c is normalized, and it should be understood that, for example, $Ni_{0.35}Al_{0.1}Yb_{0.05}(OH)_{1.15}$ or $Ni_{1.4}Al_{0.4}Yb_{0.2}(OH)_{4.6}$ is equivalent to $Ni_{0.7}Al_{0.2}Yb_{0.1}(OH)_{2.3}$.

In the case the ratio of nickel is high relative to the total of the molar ratios of nickel (Ni), aluminum (Al) and ytterbium (Yb) in the nickel composite hydroxide, the basic capacity of a battery using this nickel composite hydroxide as a positive electrode active material can be improved. In addition, aluminum and ytterbium are contained in the nickel composite hydroxide, and the presence thereof facilitates inhibition of changes in capacity accompanying temperature changes. Thus, the value of a in the aforementioned formula (I) is preferably 0.70 or more, 0.75 or more or 0.80 or more and less than 1.00.

In the case the ratio of aluminum is high relative to the total of the molar ratios of aluminum and ytterbium in the nickel composite hydroxide, costs can be reduced since this results in a relative decrease in the ratio of ytterbium. In addition, in the case the aforementioned ratio of aluminum is low, the ratio of ytterbium undergoes a relative increase, and capacity at a high temperature of 60° C., for example, can be increased in comparison with that during low temperatures. Thus, the value of b in the aforementioned formula (I) is preferably greater than 0, 0.05 or more or 0.1 or more and 0.15 or less, 0.17 or less or 0.20 or less. Moreover, the value of c in the aforementioned formula (I) is preferably greater than 0 or 0.05 or more and 0.1 or less.

Although there are no particular limitations on the form of the nickel composite hydroxide, it is preferably in the form of particles. In addition, although there are no particular limitations thereon, the mean particle diameter of the nickel composite hydroxide may be 5 μm to 20 μm. Furthermore, this particle diameter may refer to the so-called equivalent circle diameter.

<Coating Layer>

In addition, in the positive electrode active material of the present invention, the nickel composite hydroxide may further contain a coating layer that covers the nickel composite hydroxide, and the coating layer may contain cobalt.

In the case of charging a battery containing the nickel composite hydroxide having a coating layer formed thereon, the cobalt in the coating layer is converted to an oxide or peroxide having electrical conductivity resulting in the formation of an electrically conductive network among the nickel composite hydroxide. As a result, in the case of using a nickel composite hydroxide having a coating layer formed thereon, the proportion of nickel composite hydroxide involved in the charge-discharge reaction may improve in comparison with the case of using a nickel composite hydroxide not having a coating layer formed thereon.

Thus, in the case of using the nickel composite hydroxide contained in the positive electrode active material of the present invention in a battery, the charge-discharge capacity of that battery can be improved.

Although there are no particular limitations thereon, the thickness of the coating layer may be 0.2 μm or less.

In addition, although there are no particular limitations, the molar ratio between the nickel composite hydroxide and coating layer that covers it may be 97:3 to 85:15.

(Coating Layer Components)

Moreover, in the positive electrode active material of the present invention, the coating layer that covers the nickel composite hydroxide may further contain at least one type of element selected from the group consisting of aluminum, manganese and nickel.

In addition, in the positive electrode active material of the present invention, the coating layer may preferably contain manganese and nickel.

An example of the form of cobalt oxide or peroxide having electrical conductivity may be cobalt hydroxide ($Co(OH)_2$, CoOOH). Examples of the form of the cobalt hydroxide may include $\alpha\text{-}Co(OH)_2$, $\beta\text{-}Co(OH)_2$, $\beta\text{-}CoOOH$ and $\gamma\text{-}CoOOH$.

In addition, the electrical conductivity of $\gamma\text{-}CoOOH$ is known to be higher than the electrical conductivity of $\beta\text{-}CoOOH$. Thus, typically the cobalt hydroxide that forms the aforementioned electrically conductive network preferably contains a large amount of $\gamma\text{-}CoOOH$.

Here, although $\gamma\text{-}CoOOH$ is easily formed by conversion from $\alpha\text{-}Co(OH)_2$, it is difficult to form $\gamma\text{-}CoOOH$ by conversion from $\beta\text{-}Co(OH)_2$. Thus, the form of $\alpha\text{-}Co(OH)_2$ is preferable in that it maintains the form of the electrically conductive network. However, since $\alpha\text{-}Co(OH)_2$ is comparatively unstable, cobalt hydroxide easily adopts the form of $\beta\text{-}Co(OH)_2$.

In the positive electrode active material of the present invention, in addition to cobalt, the coating layer may contain at least one type of element selected from the group consisting of aluminum, manganese and nickel as previously described. Since the aluminum and other elements are located in close proximity to the cobalt hydroxide and/or are contained therein, the form of the cobalt hydroxide is stabilized. As a result, electrical conductivity of the electrically conductive network may improve, and thus, the proportion of the nickel composite hydroxide involved in the charge-discharge reaction may be further improved.

Although there are no particular limitations on the molar ratios of the cobalt, aluminum, manganese and nickel in the coating layer, the ratio of cobalt is preferably larger. The ratio of cobalt as the molar percentage based on all of the elements of aluminum, manganese and nickel present in the coating layer is, for example, 50 mol % or more, 60 mol % or more, 70 mol % or more, 80 mol % or more or 90 mol % or more.

In addition, although there are no particular limitations on the molar ratios of aluminum, manganese and nickel, the ratio of nickel is preferably larger. The ratio of nickel as the molar percentage based on all of the elements of aluminum, manganese and nickel present in the coating layer may be, for example, 50 mol % or more, 60 mol % or more, 70 mol % or more, 80 mol % or more or 90 mol % or more.

Moreover, although there are no particular limitations on the molar ratios of aluminum and manganese, the ratio of manganese is preferably larger. The ratio of manganese as the molar percentage based on all of the elements of aluminum and manganese present in the coating layer may be, for example, 50 mol % or more, 60 mol % or more, 70 mol % or more, 80 mol % or more or 90 mol % or more.

Naturally the ratio of aluminum may substantially be 100% as the molar percentage based on all of the elements of aluminum, manganese and nickel present in the coating layer.

The nickel composite hydroxide contained in the positive electrode active material of the present invention can be produced with reference to the method for producing nickel composite hydroxide indicated below.

<<Method for Producing Nickel Composite Hydroxide>>

The method for producing the nickel composite hydroxide contained in the positive electrode active material of the present invention may include a first solution preparation step for preparing a first solution consisting of a mixture of, for example, a nickel salt, aluminum salt, ytterbium salt and first solvent, a second solution preparation step for preparing a second solution consisting of a mixture of a basic substance and a second solvent, and a hydroxide synthesis step for synthesizing a nickel composite hydroxide consisting of stirring and mixing the first solution and the second solution.

<First Solution Preparation Step>

Preparation of the first solution may be carried out by mixing a nickel salt, aluminum salt, ytterbium salt and first solvent.

There are no particular limitations on the temperature, pressure or atmosphere when preparing the first solution. The temperature, pressure and atmosphere when preparing the first solution may be, for example, normal temperature, atmospheric pressure and an air atmosphere.

There are no particular limitations on the molar ratios of the nickel, aluminum and ytterbium in the first solution provided the aforementioned nickel composite hydroxide, and particularly a nickel composite hydroxide that satisfies the conditions of the aforementioned formula (I), can be produced. The molar ratios of the aforementioned elements in the first solution may correlate with the molar ratio of the aforementioned nickel composite hydroxide. In this case, the molar ratios of these elements in the first solution may be determined in consideration of the scale of the reduction thereof, such as the oxidation-reduction potential or ease with which each element is put into solid solution.

(Nickel Salt)

There are no particular limitations on the nickel salt provided it is soluble in the first solvent. Examples of nickel salts may include nitrates, acetates, sulfates, carbonates, halides, cyanides and sulfides of nickel as well as combinations thereof.

(Aluminum Salt and Ytterbium Salt)

The aforementioned description of the nickel salt can be referred to with regard to the aluminum salt and ytterbium salt.

(First Solvent)

There are no particular limitations on the first solvent provided it is able to dissolve the nickel salt, aluminum salt and ytterbium salt. Examples of the first solvent may include polar solvents such as water.

<Second Solution Preparation Step>

Preparation of the second solution may be carried out by mixing a basic substance and a second solvent.

There are no particular limitations on the temperature, pressure or atmosphere when preparing the second solution. The temperature, pressure and atmosphere when preparing the second solution may be, for example, normal temperature, atmospheric pressure and an air atmosphere.

(Basic Substance)

There are no particular limitations on the basic substance, and examples thereof may include hydroxides of alkaline metals such as sodium hydroxide or potassium hydroxide, hydroxides of alkaline earth metals such as calcium hydroxide, and combinations thereof.

(Second Solvent)

The aforementioned description of the first solvent can be referred to with regard to the second solvent.

<Hydroxide Synthesis Step>

Synthesis of hydroxide may be carried out by stirring and mixing the first solution and the second solution to synthesize a nickel composite hydroxide.

In the hydroxide synthesis step, the pH and temperature of the solutions may be optionally and selectively adjusted when stirring and mixing the first solution and the second solution. A pH sensor or pH controller can be used to adjust the pH of the solutions. A heater or temperature controller equipped with a sensor can be used to adjust the temperature of the solutions.

In addition, the hydroxide synthesis step may further include a step for centrifuging the resulting solution and nickel composite hydroxide, a step for filtering the solution containing the nickel composite hydroxide, and/or a step for drying the solution or slurry containing the nickel composite hydroxide under reduced pressure.

<Coating Layer Formation Step>

The method for producing a nickel composite hydroxide contained in the positive electrode active material of the present invention may include, for example, a third solution preparation step for preparing a third solution containing a cobalt salt and a third solvent, a fourth solution preparation step for preparing a fourth solution containing a basic substance and a fourth solvent, a fifth solution preparation step for preparing a fifth solution containing the aforementioned synthesized nickel composite hydroxide and a fifth solvent, and a coating layer formation step for adding the aforementioned third solution and fourth solution to the aforementioned fifth solution and mixing.

(Third Solution Preparation Step)

Preparation of the third solution may be carried out by stirring and mixing a cobalt salt and the third solvent, and optionally and selectively at least one type of element selected from the group consisting of an aluminum salt, manganese salt and nickel salt.

There are no particular limitations on the temperature, pressure or atmosphere when preparing the third solution. The temperature, pressure and atmosphere when preparing the third solution may be, for example, normal temperature, atmospheric pressure and an air atmosphere.

Although there are no particular limitations on the molar ratios of cobalt, aluminum, manganese and nickel in the third solution, the ratio of cobalt is preferably larger. The ratio of cobalt as the molar percentage based on all of the elements of cobalt, aluminum, manganese and nickel present in the third solution may be, for example, 50 mol % or more, 60 mol % or more, 70 mol % or more, 80 mol % or more or 90 mol % or more.

In addition, although there are no particular limitations on the molar ratios of aluminum, manganese and nickel, the ratio of nickel is preferably larger. The ratio of nickel as the molar percentage based on all of the elements of aluminum, manganese and nickel present in the third solution may be, for example, 50 mol % or more, 60 mol % or more, 70 mol % or more, 80 mol % or more or 90 mol % or more.

Moreover, although there are no particular limitations on the molar ratios of aluminum and manganese, the ratio of manganese is preferably larger. The ratio of manganese as the molar percentage based on all of the elements of aluminum and manganese present in the third solution may be, for example, 50 mol % or more, 60 mol % or more, 70 mol % or more, 80 mol % or more or 90 mol % or more.

Naturally, any of the ratios of aluminum, manganese or nickel may substantially be 100% as the molar percentage based on all of the elements of aluminum, manganese and nickel present in the third solution.

The molar ratios of these elements in the third solution may be determined in consideration of the scale of the reduction thereof, such as the oxidation-reduction potential or ease with which each element is put into solid solution.

The inventors of the present invention found that, in the case a component other than cobalt, such as aluminum, manganese and/or nickel, is contained in the third solution, the nickel composite hydroxide is easily coated with the coating layer. As a result, the proportion of the nickel composite hydroxide covered by the coating layer, namely the coverage thereof, may improve.

Without being bound by theory, the reason for the nickel composite hydroxide being easily covered by the coating layer is thought to be that, as a result of the nickel composite hydroxide having an $\alpha$-type structure that is covered by a compound having a similar $\alpha$-type structure, coating crystals easily cover the crystals of the nickel composite hydroxide.

Thus, in the case of charging a battery containing a nickel composite hydroxide having improved coverage, an electrically conductive network may be formed more effectively among the nickel composite hydroxide.

Furthermore, coverage refers to the value calculated from an image of the nickel composite hydroxide covered with the coating layer obtained by scanning electron microscope-energy dispersive X-ray spectrometry (ESM-EDX). More specifically, coverage refers to the ratio of the area of an EDX image of the coating layer of the nickel composite hydroxide to the area captured in the SEM image of the nickel composite hydroxide.

Although there are no particular limitations thereon, the value of coverage may be greater than 0%, 10% or more, 30% or more, 50% or more, 70% or more or 90% or more.

Examples of cobalt salts and, optionally and selectively, salts obtained by forming salts of aluminum, manganese and nickel, may include nitrates, acetates, sulfates, carbonates, halides, cyanides and sulfides as well as combinations thereof.

There are no particular limitations on the third solvent provided it is able to dissolve cobalt salts, and optionally and selectively, salts of aluminum, manganese and nickel. Examples of the third solvent may include polar solvents such as water.

(Fourth Solution Preparation Step)

Preparation of the fourth solution may be carried out by mixing and stirring a basic substance and a fourth solvent. The second solution preparation step should be referred to with regard to this step.

(Fifth Solution Preparation Step)

Preparation of the fifth solution may consist of preparing a fifth solution containing the aforementioned synthesized nickel composite hydroxide and a fifth solvent.

There are no particular limitations on the fifth solvent provided it does not destroy the synthesize nickel composite hydroxide. An example of this fifth solvent is water.

There are no particular limitations on the temperature, pressure or atmosphere when preparing the fifth solution. The temperature, pressure and atmosphere when preparing the fifth solution may be, for example, normal temperature, atmospheric pressure and an air atmosphere.

(Coating Layer Formation Step)

Formation of the coating layer on the synthesized nickel composite hydroxide may be carried out by adding the aforementioned third and fourth solutions to the fifth solution containing the nickel composite hydroxide.

In the coating layer formation step, the third solution containing components of the coating layer and the fourth solution containing the basis substance are added to the fifth solution containing the nickel composite hydroxide, and the coating layer may be formed on the nickel composite hydroxide while adjusting pH. In addition, the temperature may also be adjusted in this step. The aforementioned hydroxide synthesis step should be referred to with regard to adjustment of pH and temperature.

FIG. 1 is a schematic diagram showing a step for forming the coating layer containing cobalt and the like on the nickel composite hydroxide. FIG. 1 schematically illustrates the formation of a coating layer 4 on a nickel composite hydroxide 1 by reacting a basic substance 2 and element 3 such as cobalt.

The description of the aforementioned positive electrode active material of the present invention can be referred to with regard to the method for producing the nickel composite hydroxide.

<<Alkaline Battery>>

The alkaline battery of the present invention contains the aforementioned positive electrode active material of the present invention. The alkaline battery of the present invention contains, for example, a laminate obtained by laminating a positive electrode layer containing the positive electrode active material of the present invention, a separator layer and a negative electrode layer in that order, and an electrolyte, and this laminate is immersed in the electrolyte.

In the alkaline battery of the present invention, changes in battery capacity accompanying a temperature change can be inhibited by the action and effects of the nickel composite hydroxide contained in the positive electrode active material of the present invention.

Examples of the alkaline battery may include, but are not limited to, a nickel-cadmium battery, nickel-zinc battery, nickel-hydrogen battery and nickel-manganese battery. These batteries may be rechargeable batteries that can be recharged or non-rechargeable batteries that cannot be recharged.

The following provides an explanation of the configuration of a nickel-hydrogen battery and a production method thereof as one embodiment of the alkaline battery of the present invention.

<Configuration of Nickel-Hydrogen Battery>

A nickel-hydrogen battery contains a laminate, obtained by laminating a positive electrode layer mainly containing the positive electrode active material of the present invention, a separator layer and a negative electrode layer in that order, and an electrolyte, and the laminate is immersed in the electrolyte.

(Positive Electrode Layer)

Examples of the positive electrode layer may include that in which a positive electrode material is formed in the form of a layer on a plate-like positive electrode current collector, and that in which a positive electrode material is packed into a positive electrode current collector having a pore structure, and particularly a continuous pore structure.

Examples of the positive electrode current collector may include, but are not limited to, punched metal, expanded metal, wire mesh, foamed metal such as foamed nickel, metal fiber sintered contact mesh and metal-plated resin sheets.

The positive electrode material contains the aforementioned positive electrode active material of the present invention and, optionally and selectively, a conductive assistant, binder and thickener.

There are no particular limitations on the positive electrode active material provided it includes the aforementioned positive electrode active material of the present invention, and may further contain a material known to be a positive electrode active material of a nickel-hydrogen battery.

There are no particular limitations on the conductive assistant provided it can be used for a nickel-hydrogen battery, and cobalt oxide, for example, can be used as a conductive assistant.

There are no particular limitations on the binder or thickener provided it can be used for a nickel-hydrogen battery, and examples thereof may include polymer resins such as polyvinylidene fluoride (PVdF), butadiene rubber (BR), polyvinyl alcohol (PVA), carboxymethyl cellulose (CMC) and combinations thereof.

(Separator Layer)

There are no particular limitations on the material of the separator provided it can be used for a nickel-hydrogen battery, and examples thereof may include polyolefin nonwoven fabric such as polyethylene nonwoven fabric or polypropylene nonwoven fabric, polyamide nonwoven fabric and hydrophilic treatment products thereof.

(Negative Electrode Layer)

Examples of the negative electrode layer may include that in which a negative electrode material is formed in the form of a layer on a plate-like negative electrode current collector, and that in which a negative electrode material is packed into a negative electrode current collector having a pore structure, and particularly a continuous pore structure.

The description relating to the positive electrode current collector of the positive electrode layer can be referred to with regard to the negative electrode current collector of the negative electrode layer.

The negative electrode material contains a negative electrode active material, and optionally and selectively, a conductive assistant, binder and thickener.

There are no particular limitations on the negative electrode active material provided it can be used for a nickel-hydrogen battery, and a hydrogen storage alloy, and particularly a powdered hydrogen storage alloy, can be used.

The description relating to the conductive assistant, binder and thickener of the positive electrode material can be referred to with respect to the conductive assistant, binder and thickener of the negative electrode material.

(Electrolyte)

There are no particular limitations on the electrolyte provided it is an aqueous alkaline solution, and examples thereof may include an aqueous potassium hydroxide solution, aqueous sodium hydroxide solution, aqueous lithium hydroxide solution and combinations thereof.

<Method for Producing Nickel-Hydrogen Battery>

The method for producing a nickel-hydrogen battery includes a positive electrode fabrication step, a negative electrode fabrication step and an assembly step.

(Positive Electrode Fabrication Step)

The positive electrode contains a positive electrode current collector and a positive electrode material. The positive electrode can be fabricated using a method known in the art. The following indicates one example of a positive electrode fabrication method.

The aforementioned positive electrode material is mixed with a solvent such as water to prepare a positive electrode material slurry. This slurry is packed into a positive electrode current collector having a continuous pore structure followed by drying and/or sintering and rolling to allow the obtaining of a positive electrode.

(Negative Electrode Fabrication Step)

The negative electrode contains a negative electrode current collector and a negative electrode material. The negative electrode can be fabricated using a method known in the art. The negative electrode fabrication step can be carried out in the same manner as the positive electrode fabrication step with the exception of employing, for example, materials relating to the negative electrode current collector and negative electrode material.

(Assembly Step)

A laminate is fabricated in which a separator layer in the form of a separator is interposed between the fabricated positive electrode layer and negative electrode layer. As a result, a laminate can be obtained in which the positive electrode layer, separator layer and negative electrode layer are laminated in that order. On the other hand, a nickel-hydrogen battery can be produced by injecting electrolyte into the casing serving as the outer cladding of the battery followed by restraining the previously described laminate therein and immersing in the electrolyte.

The description of the aforementioned positive electrode active material of the present invention and the description of the aforementioned method for producing a nickel-hydrogen battery can be referred to with regard to the alkaline battery of the present invention.

Although the following provides a more detailed explanation of the present invention with reference to the examples indicated below, it goes without saying that the scope of the present invention is not limited by these examples.

EXAMPLES

Example 1: Nickel Composite Hydroxide

<Preparation of First Solution>

A first solution was prepared by dissolving a nickel salt in the form of nickel sulfate, an aluminum salt in the form of aluminum sulfate and an ytterbium salt in the form of ytterbium sulfate in a first solvent in the form of water at a molar ratio of nickel to aluminum to ytterbium of 0.8:0.15:0.05.

<Preparation of Second Solution>

A second solution was prepared by mixing a basic substance in the form of sodium hydroxide and a second solvent in the form of water. The concentration of the second solution was 32% by weight.

<Mixing of First Solution and Second Solution>

1000 g of water were placed in a glass beaker serving as a reaction vessel followed by suitably adding the second solution to maintain the pH at 10.0 using a pH sensor and pH controller, and maintaining the temperature at 40° C. using a heater and temperature controller equipped with a sensor. The first solution and the second solution were added to this reaction vessel so as to maintain the aforementioned temperature and pH followed by stirring and mixing, resulting in the formation of a precipitate.

After cooling the mixed solution containing precipitate to room temperature, the mixed solution was filtered to obtain the precipitate. This precipitate was then washed with pure water and dried to obtain a nickel composite hydroxide. Furthermore, as a result of measuring the nickel composite hydroxide by inductively coupled plasma atomic emission spectroscopy (ICP-AES), the molar ratio of nickel to aluminum to ytterbium in this nickel composite hydroxide was determined to be 0.8:0.15:0.05.

Examples 2 and 3: Nickel Composite Hydroxides

Nickel composite hydroxides of Examples 2 and 3 were prepared in the same manner as Example 1 with the exception of changing the molar ratio of nickel, aluminum and ytterbium during preparation of the first solution. The molar ratio of nickel to aluminum to ytterbium in Example 2 was 0.775:0.15:0.075, and the molar ratio thereof in Example 3 was 0.75:0.15:0.10.

Example 4: Nickel Composite Hydroxide Having Coating Layer Formed Thereon

<Third Solution Preparation Step>

A third solution was prepared by dissolving a cobalt salt in the form of cobalt sulfate and an aluminum salt in the form of aluminum sulfate in a third solvent in the form of water at a molar ratio of cobalt to aluminum of 0.85:0.15.

<Fourth Solution Preparation Step>

A basic aqueous solution in the form of the aforementioned second solution was used for the fourth solution.

<Fifth Solution Preparation Step>

4500 g of water and 450 g of the nickel composite hydroxide obtained in Example 1 were placed in a glass beaker serving as a reaction vessel to prepare a fifth solution.

<Coating Layer Formation Step>

The fourth solution was suitably dropped into the fifth solution to maintain the pH at 9.5 using a pH sensor and pH controller followed by maintaining the temperature at 40° C. using a heater and a temperature controller equipped with a sensor. The third solution and the fourth solution were added to this fifth solution so that the amount of coated hydroxide obtained from the third solution was 5 mol % based on a value of 100 mol % for the amount of the nickel composite hydroxide while maintaining the temperature and pH, followed by stirring, mixing and holding at these conditions for 3 hours. As a result, a coating layer consisting of a hydroxide composed of cobalt and aluminum was formed on the nickel composite hydroxide obtained in Example 1.

After cooling the mixed solution containing the nickel composite hydroxide coated with the hydroxide composed of cobalt and aluminum, the mixed solution was filtered resulting in the obtaining of a precipitate. This precipitate was washed with pure water and dried to obtain a nickel composite hydroxide having a coating layer formed thereon.

Furthermore, as a result of measuring this coated nickel composite hydroxide by ICP-AES, the molar ratio of nickel to aluminum to ytterbium to cobalt in the nickel composite hydroxide having a coating layer formed thereon was 0.762:0.150:0.048:0.040. Since the molar ratio of nickel to aluminum to ytterbium in the nickel composite hydroxide of Example 1 was 0.8:0.15:0.05, the molar ratio of cobalt to aluminum of the coating layer was 0.85:0.15.

Example 5: Nickel Composite Hydroxide Having Coating Layer Formed Thereon

A coated nickel composite hydroxide was obtained in the same manner as Example 4 with the exception of preparing a third solution having a cobalt salt in the form of cobalt sulfate and a manganese salt in the form of manganese sulfate dissolved therein at a molar ratio of cobalt to manganese of 0.85:0.15 in the third solution preparation step.

Furthermore, as a result of measuring this coated nickel composite hydroxide by ICP-AES, the molar ratio of nickel to aluminum to ytterbium to cobalt to manganese in the coated nickel composite hydroxide was 0.762:0.143:0.048:0.040:0.007. Since the molar ratio of nickel to aluminum to ytterbium in the nickel composite hydroxide of Example 1 was 0.8:0.15:0.05, the molar ratio of cobalt to manganese of the coating layer was 0.85:0.15.

Example 6: Nickel Composite Hydroxide Having Coating Layer Formed Thereon

A coated nickel composite hydroxide was obtained in the same manner as Example 4 with the exception of preparing a third solution having a cobalt salt in the form of cobalt sulfate, a manganese salt in the form of manganese sulfate and a nickel salt in the form of nickel sulfate dissolved therein at a molar ratio of cobalt to manganese to nickel of 0.85:0.03:0.12 in the third solution preparation step.

Furthermore, as a result of measuring this coated nickel composite hydroxide by ICP-AES, the molar ratio of nickel to aluminum to ytterbium to cobalt to manganese in the coated nickel composite hydroxide was 0.768:0.143:0.048:0.040:0.001. Since the molar ratio of nickel to aluminum to ytterbium in the nickel composite hydroxide of Example 1 was 0.8:0.15:0.05, the molar ratio of cobalt to manganese to nickel of the coating layer was 0.85:0.03:0.12.

Example 7: Nickel Composite Hydroxide Having Coating Layer Formed Thereon

A coated nickel composite hydroxide was obtained in the same manner as Example 4 with the exception of preparing a third solution using only a cobalt salt in the form of cobalt sulfate in the third solution preparation step, and adding the third solution and the fourth solution to the fifth solution in the coating film formation step so that the amount of coated hydroxide obtained from the third solution was 8.7 mol % based on a value of 100 mol % for the nickel composite hydroxide while maintaining temperature and pH, followed by stirring and mixing.

Furthermore, as a result of measuring by ICP-AES, the molar ratio of nickel to aluminum to ytterbium to cobalt in the coated nickel composite hydroxide was 0.736:0.138:0.046:0.080.

Comparative Example 1: Nickel Composite Hydroxide

Nickel composite hydroxide of Comparative Example 1 was obtained in the same manner as Example 1 with the exception of preparing the first solution by dissolving a nickel salt in the form of nickel sulfate and an aluminum salt in the form of aluminum sulfate in a first solvent in the form of water at a molar ratio of nickel to aluminum of 0.8:0.2. Furthermore, as a result of measuring by ICP-AES, the molar ratio of nickel to aluminum of this nickel composite hydroxide was 0.8:0.2.

Comparative Example 2: Nickel Composite Hydroxide

Nickel composite hydroxide of Comparative Example 2 was obtained in the same manner as Example 1 with the exception of preparing the first solution by dissolving a nickel salt in the form of nickelسulfate, an aluminum salt in the form of aluminum sulfate and an erbium salt in the form of erbium sulfate in a first solvent in the form of water at a molar ratio of nickel to aluminum to erbium of 0.8:0.15:0.05. Furthermore, as a result of measuring by ICP-AES, the molar ratio of nickel to aluminum to erbium of this nickel composite hydroxide was 0.8:0.15:0.05.

Comparative Example 3: Nickel Composite Hydroxide

Nickel composite hydroxide of Comparative Example 3 was obtained in the same manner as Example 1 with the exception of preparing the first solution by dissolving a nickel salt in the form of nickel sulfate, an aluminum salt in the form of aluminum sulfate and a yttrium salt in the form of yttrium sulfate in a first solvent in the form of water at a molar ratio of nickel to aluminum to yttrium of 0.8:0.15:0.05. Furthermore, as a result of measuring by ICP-AES, the molar ratio of nickel to aluminum to yttrium of this nickel composite hydroxide was 0.8:0.15:0.05.

Comparative Example 4: Nickel Composite Hydroxide

Nickel composite hydroxide of Comparative Example 4 was obtained in the same manner as Example 1 with the exception of preparing the first solution by dissolving a nickel salt in the form of nickel sulfate and a ytterbium salt in the form of ytterbium sulfate in a first solvent in the form of water at a molar ratio of nickel to ytterbium of 0.8:0.2. Furthermore, as a result of measuring by ICP-AES, the molar ratio of nickel to ytterbium of this nickel composite hydroxide was 0.8:0.2.

<<Evaluation>>
<Evaluation of Battery Charging and Discharging>

Evaluation of battery charging and discharging was carried out by fabricating nickel-hydrogen batteries using the nickel composite hydroxides of each example for the positive electrode active materials thereof, and carrying out charge-discharge tests with these batteries.

<Fabrication of Nickel-Hydrogen Batteries>

Positive Electrode Fabrication Step

Positive electrode active materials in the form of the nickel composite hydroxides of each example, a conductive assistant in the form of a cobalt oxide and a binder in the form of PVdF were mixed at a weight ratio of 85.5:9.5:5.0. These mixtures were then mixed with water to prepare positive electrode material slurries. The slurries were packed into a positive electrode current collector in the form of foamed nickel followed by drying over the course of 48 hours at 80° C. and rolling to obtain positive electrodes.

Negative Electrode Fabrication Step

A negative electrode active material in the form of a hydrogen storage alloy, a thickener in the form of carboxymethyl cellulose (CMC) and a binder in the form of polyvinyl alcohol (PVA) were mixed at a weight ratio of 98.4:0.8:0.8. This mixture was then mixed with water to prepare a negative electrode material slurry. This slurry was packed into a negative electrode current collector in the form of foamed nickel followed by drying over the course of 48 hours at 80° C. and rolling to obtain a negative electrode. A total of two negative electrodes were obtained by repeating this step.

Assembly Step

An acrylic sheet, a negative electrode layer in the form of a negative electrode, a separator layer, a positive electrode layer in the form of a positive electrode, a separator layer, a negative electrode layer in the form of a negative electrode and an acrylic sheet were laminated in that order followed by crimping with screws to fabricate laminates. Furthermore, a polyolefin nonwoven fabric composed of polyethylene and polypropylene was used for the material of the separator layer.

The laminates fabricated in this manner were immersed in an acrylic container containing an electrolyte (electrolyte containing KOH at 6 mol/L) followed by arranging a reference electrode in the form of an Hg/HgO electrode in the vicinity of the laminate to fabricate nickel-hydrogen batteries.

(Charge-Discharge Testing)

Charge-discharge testing was carried out on each of the nickel-hydrogen batteries using the nickel composite hydroxides of each example as positive electrode active materials. The charge-discharge test consisted of the procedures described in the following (1) to (4) carried out in that order:

(1) batteries were charged over the course of 14 hours at a load current of 43 mA;

(2) a recovery time of 30 minutes was provided;

(3) discharge capacity was measured by allowing the batteries to discharge until the battery voltage reached 1.0 V; and, (4) a recovery time of 30 minutes was provided.

Furthermore, charge-discharge testing was carried out two times each on the nickel-hydrogen batteries using the nickel composite hydroxides of Examples 1 to 3 and Comparative Examples 1 to 4. The temperature of the batteries of each example was maintained at 25° C. (first round) and 60° C. (second round) in the first and second rounds of the charge-discharge test.

In addition, charge-discharge tests were also carried out on the nickel-hydrogen batteries using the nickel composite hydroxides of Examples 4 to 7. The temperature of the batteries of Examples 4 to 7 was maintained at 25° C. in this charge-discharge testing. The results of charge-discharge testing for each example are shown in Table 1 below.

TABLE 1

| | Nickel Composite Hydroxide | | Coating Layer | | First discharge capacity (25° C., mAh/g) | Second discharge capacity (60° C., mAh/g) | Charge-discharge efficiency (1st discharge capacity/2nd discharge capacity, %) |
|---|---|---|---|---|---|---|---|
| | composition | molar ratio | composition | molar ratio | | | |
| Example 1 | Ni:Al:Yb | 0.8:0.15:0.05 | — | — | 394 | 332 | 84 |
| Example 2 | Ni:Al:Yb | 0.775:0.15:0.075 | — | — | 391 | 301 | 77 |
| Example 3 | Ni:Al:Yb | 0.75:0.15:0.10 | — | — | 394 | 291 | 74 |
| Example 4 | Ni:Al:Yb | 0.8:0.15:0.05 | Co:Al | 0.85:0.15 | 435 | — | — |
| Example 5 | Ni:Al:Yb | 0.8:0.15:0.05 | Co:Mn | 0.86:0.14 | 453 | — | — |
| Example 6 | Ni:Al:Yb | 0.8:0.15:0.05 | Co:Mn:Ni | 0.86:0.02:0.12 | 471 | — | — |
| Example 7 | Ni:Al:Yb | 0.8:0.15:0.05 | Co | — | 408 | — | — |
| Comp. Ex. 1 | Ni:Al | 0.8:0.20 | — | — | 387 | 152 | 39 |
| Comp. Ex. 2 | Ni:Al:Er | 0.8:0.15:0.05 | — | — | 336 | 216 | 64 |
| Comp. Ex. 3 | Ni:Al:Y | 0.8:0.15:0.05 | — | — | 349 | 213 | 61 |
| Comp. Ex. 4 | Ni:Yb | 0.8:0.20 | — | — | 225 | 374 | 166 |

It can be understood from Table 1 that the discharge capacities of those batteries using the nickel composite hydroxides of Comparative Examples 1 to 4 changed considerably in comparison with the case of a battery temperature of 25° C. and the case of a battery temperature of 60° C. More specifically, in Comparative Examples 1 to 4, in the case of assigning a value of 100% to the first discharge capacity, the difference in discharge capacities between the first and second rounds of testing is at least 36%.

In contrast, it can also be understood from Table 1 that the discharge capacities of those batteries using the nickel composite hydroxides of Examples 1 to 3 exhibited hardly any change in comparison with the case of a battery temperature of 25° C. and the case of a battery temperature of 60° C. More specifically, in Examples 1 to 3, in the case of assigning a value of 100% to the first discharge capacity, the difference in discharge capacities between the first and second rounds of testing is at most 26%.

Thus, the nickel composite hydroxides of Examples 1 to 3 are able to inhibit changes accompanying temperature changes, and particularly changes in battery capacity.

Furthermore, it can also be understood from Table 1 that, according to the nickel composite hydroxides of Examples 1 to 3 in which the ratio of aluminum (Al) is constant, a higher ratio of nickel relative to nickel (Ni) and ytterbium (Yb) results in a greater tendency for charge-discharge efficiency (%) to approach 100%.

Thus, according to the nickel composite hydroxides of Examples 1 to 3, in the case the ratio of aluminum is constant, a higher ratio of nickel to nickel and ytterbium can be understood to enable changes accompanying temperature change, and particularly changes in battery capacity, to be more effectively inhibited.

Figure 2:
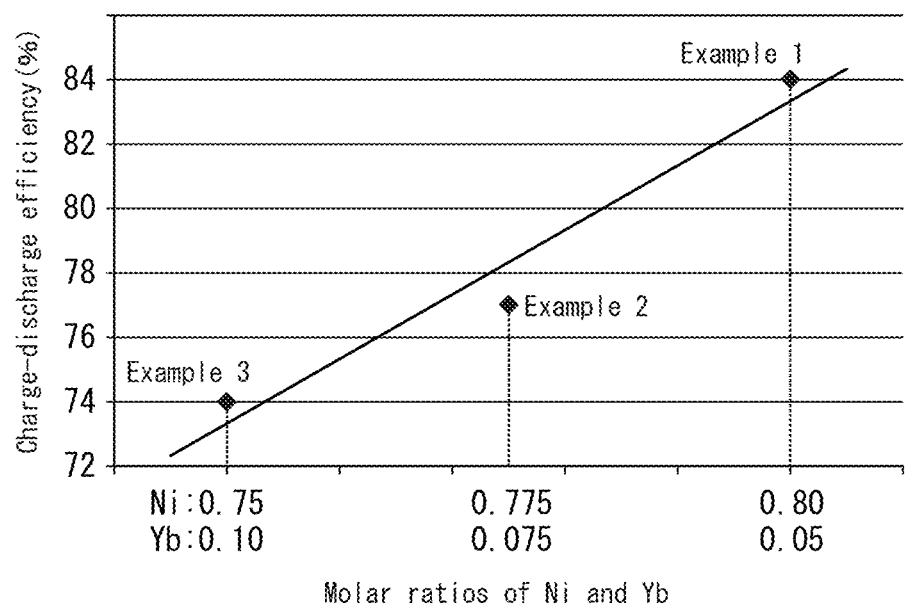
FIG. 2 is a graph indicating the relationship between the molar ratio of Ni and Yb and charge-discharge efficiency (%) for the nickel composite hydroxides of Examples 1 to 3.
Figures 3A, 3B, 3C, 3D:
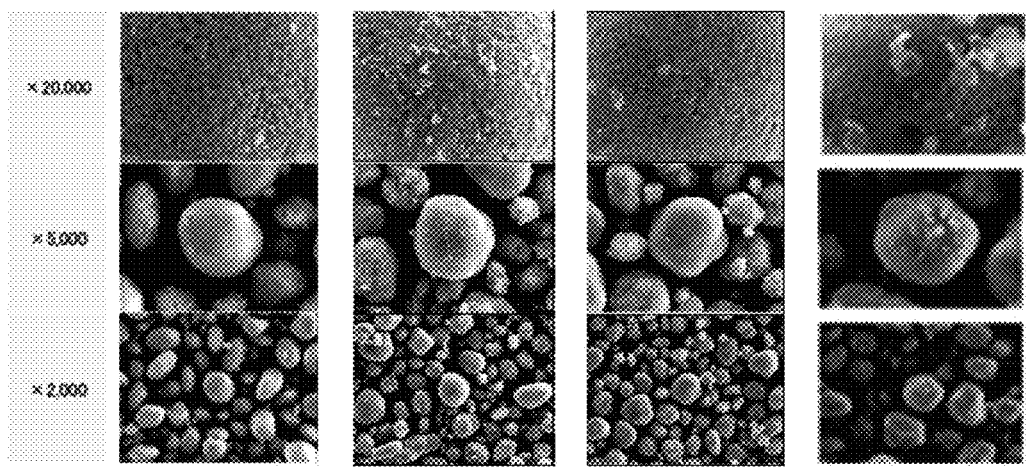
FIGS. 3(a) to 3(d) depict scanning electron micrographs (SEM) of the nickel composite hydroxides of Examples 4 to 7 respectively having a coating layer thereon.

FIG. 2 is a graph indicating the relationship between the molar ratios of Ni and Yb and charge-discharge efficiency (%) for the nickel composite hydroxides of Examples 1 to 3. In FIG. 2, with respect to the nickel composite hydroxides of Examples 1 to 3 in which the ratio of aluminum (Al) is constant, a higher ratio of nickel to nickel and ytterbium can be understood to enable charge-discharge efficiency to more closely approach 100%.

In addition, in the batteries in Table 1 that use nickel composite hydroxides having a coating film formed thereon of Examples 4 to 7 (to also be referred to as the "batteries of the examples"), discharge capacity improved by at least 14 mAh/g in comparison with the nickel composite hydroxide not having a coating layer formed thereon of Example 1.

Without being bound by theory, the reason for the improvement in discharge capacity is thought to be due to the cobalt in the coating layer of the batteries of Examples 4 to 7 being converted to an oxide or peroxide having electrical conductivity, thereby resulting in the formation of an electrically conductive network among the nickel composite hydroxide. More specifically, the proportion of nickel composite hydroxide involved in the charge-discharge reaction improves due to the formation of this electrically conductive network, and this is thought to result in improved discharge capacity.

Moreover, the discharge capacities of the batteries of Examples 4 to 6 in Table 1 are further improved in comparison with the discharge capacity of the battery of Example 7. This is thought to be due to coverage of the coating layer of the nickel composite hydroxides of Examples 4 to 6 being higher than that in Example 7. More specifically, as a result of the coverages of the coating layers of the nickel composite hydroxides of Examples 4 to 6 being comparatively high, in the case of charging a battery containing these nickel composite hydroxides, the electrically conductive network is thought to be formed more effectively among the nickel composite hydroxide.

Furthermore, the containing of components other than cobalt, such as aluminum, manganese and/or nickel, in the third solution is related to improvement of coverage of the coating layer of the nickel composite hydroxides.

In addition, another reason for the improved discharge capacities of the batteries of Examples 4 to 6 in comparison with the discharge capacity of the battery of Example 7 in Table 1 is thought to be that, as a result of the coating layer containing elements such as aluminum in addition to cobalt, it became possible to control the form of the cobalt hydroxide. More specifically, the form of the cobalt hydroxide, namely $\alpha$-Co(OH)$_2$, is thought to have been stabilized, and as a result thereof, the electrical conductivity of the electrical conductive network improves, thus further improving the proportion of nickel composite hydroxide involved in the charge-discharge reaction.

FIGS. 3(a) to 3(d) depict SEM micrographs of the nickel composite hydroxides of Examples 4 to 7 respectively having a coating layer formed thereon. It can be understood from FIGS. 3(a) to 3(d) that the majority of the nickel composite hydroxides of Examples 4 to 6 are covered by a coating layer in comparison with that of Example 7.

<Evaluation of Nickel Composite Hydroxide Stability in High-Temperature Aqueous Alkaline Solution>

The stability of the nickel composite hydroxides of Example 1 and Comparative Examples 1 to 4 in a high-temperature aqueous alkaline solution was evaluated. More specifically, this evaluation was carried out by an immersion test. This immersion test consisted of the procedures described in the following (1) to (4) carried out in that order:

(1) X-ray diffraction analyses (XRD) were carried out on the nickel composite hydroxides prior to immersion;

(2) 5 g of each nickel composite hydroxide subjected to X-ray diffraction analysis and 50 mL of 6 mol/L KOH aqueous solution were sealed in sample bottles;

(3) the sample bottles of (2) were placed in a constant temperature bath set to 70° C. and allowed to stand in this state over the course of 7 days; and, (4) following completion of (3), the solutions in the sample bottles were filtered to filter out the precipitate followed by washing with pure water and carrying out X-ray diffraction analyses on the nickel composite hydroxides following immersion.

Figure 4:
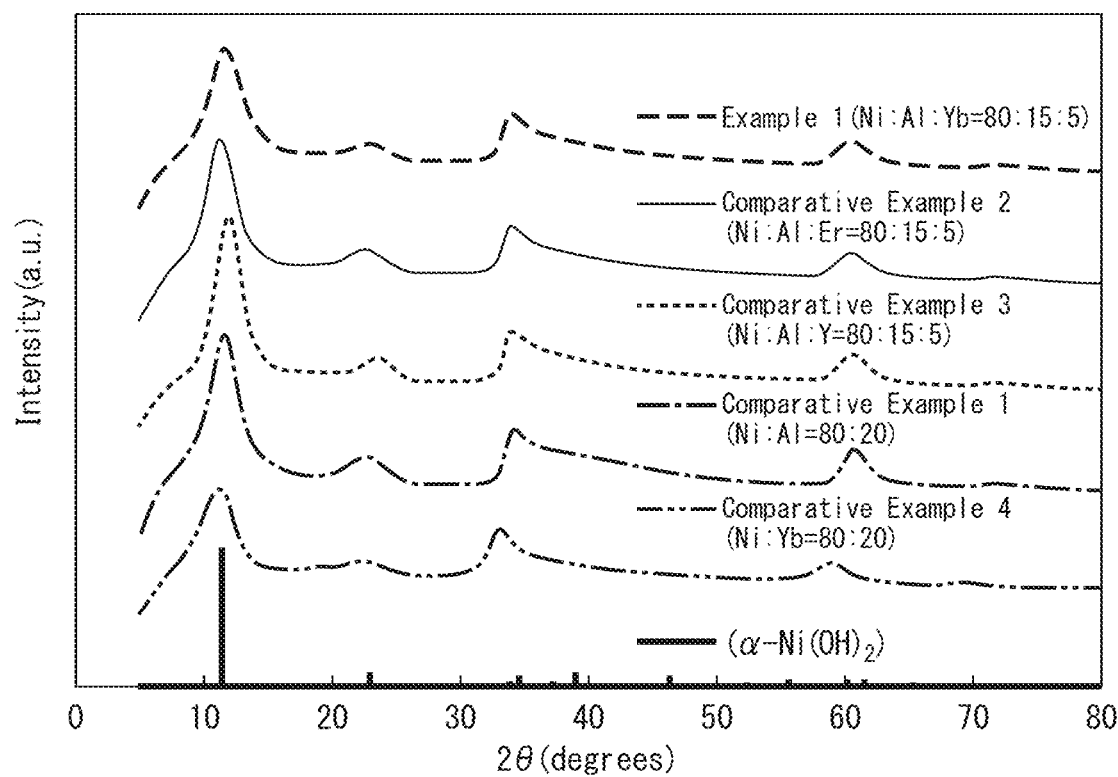
FIG. 4 is a graph indicating the X-ray diffraction (XRD) patterns of the nickel composite hydroxides of Example 1 and Comparative Examples 1 to 4 and an α-type nickel hydroxide before an immersion test.

FIG. 4 is a graph indicating the X-ray diffraction (XRD) patterns of the nickel composite hydroxides of Example 1 and Comparative Examples 1 to 4 and $\alpha$-type nickel hydroxide prior to the immersion test. In addition, FIG. 5 is a graph indicating the X-ray diffraction (XRD) patterns of the nickel composite hydroxides of Example 1 and Comparative Examples 1 to 4 and a $\beta$-type nickel hydroxide after the immersion test.

The X-ray diffraction pattern of $\alpha$-type nickel hydroxide ($\alpha$-Ni(OH)$_2$) is shown for reference purposes. A characteristic peak of this X-ray diffraction pattern is present in the vicinity of $2\theta=11°$, and since peaks of the X-ray diffraction patterns of the nickel composite hydroxides of Example 1 and Comparative Examples 1 to 4 are located at nearly the same locations as this peak, the nickel composite hydroxides of each of these examples prior to the immersion test can be understood to have an $\alpha$-type structure.

Furthermore, it can be understood from FIG. 4 that the peaks of the nickel composite hydroxides of each example have a broad width. This indicates that at least one type of element, excluding nickel, is at least partially solid-dissolved in nickel hydroxide.

Figure 5:
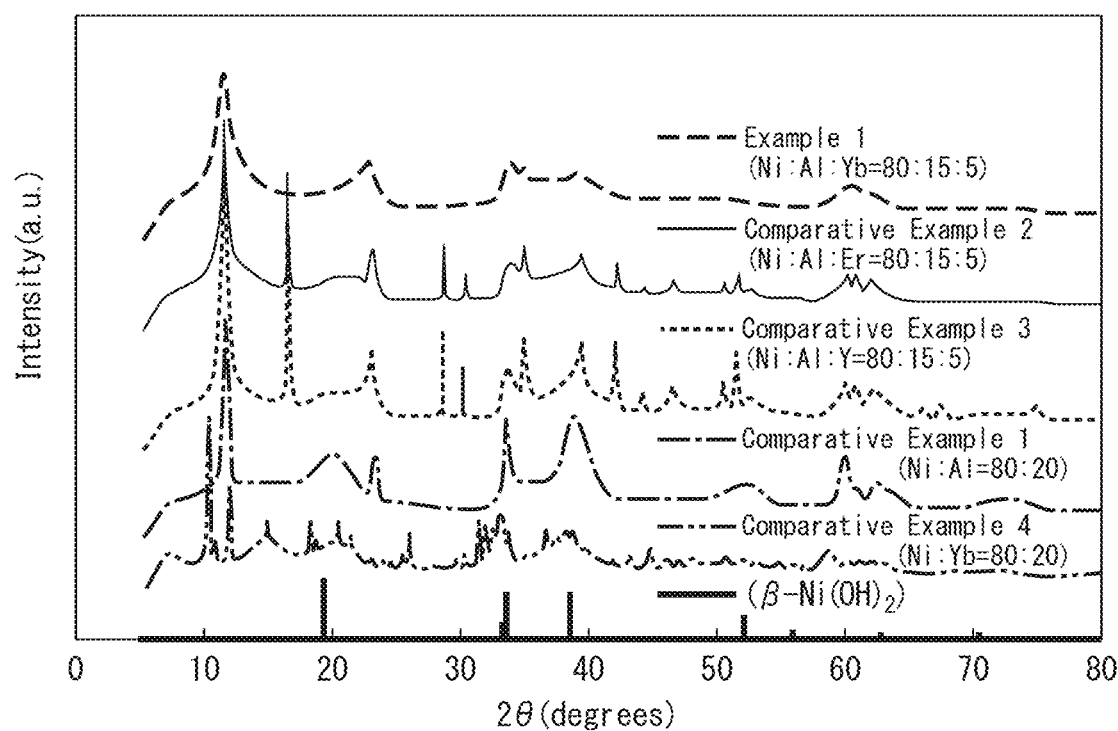
FIG. 5 is a graph indicating the X-ray diffraction (XRD) patterns of the nickel composite hydroxides of Example 1 and Comparative Examples 1 to 4 and a β-type nickel hydroxide after an immersion test.

When comparing the X-ray diffraction patterns before and after the immersion test as depicted in FIGS. 4 and 5, it can be understood from FIG. 4 that the $\alpha$-type structure of the nickel composite hydroxides of Comparative Examples 1 to 4 has been destroyed. In addition, in FIG. 5, the X-ray diffraction pattern of $\beta$-type nickel hydroxide ($\beta$-Ni(OH)$_2$) is shown for reference purposes, and it can be understood from FIG. 5 that a characteristic peak of this X-ray diffraction pattern is present in the vicinity of $2\theta=19°$, and that the structure of the nickel composite hydroxide of Comparative Example 1 (composed of nickel and aluminum) in particular is started to be converted to a $\beta$-type structure.

In contrast thereto, when comparing the X-ray diffraction patterns before and after the immersion test as depicted in FIGS. 4 and 5, it can be understood from FIG. 5 that there has been hardly any destruction at all of the $\alpha$-type structure of the nickel composite hydroxide of Example 1.

Thus, the nickel composite hydroxide of Example 1 can be understood to have an $\alpha$-type structure and retain a high degree of stability with respect to maintaining this $\alpha$-type structure. Namely, the nickel composite hydroxide of Example 1 is able to inhibit conversion from an $\alpha$-type structure to a β-type structure under conditions of being immersed in an aqueous alkaline solution at a high temperature of, for example, 70° C.

According to these findings, the reason for a battery employing the nickel composite hydroxide of Example 1 as a positive electrode active material undergoing hardly any change in the discharge capacity thereof in comparison with the case of a battery temperature of 25° C. and the case of a battery temperature of 60° C. is thought to be due to the high stability of the nickel composite hydroxide, and particularly the high stability thereof at high temperatures.

Although the present description has provided a detailed description of preferable embodiments of the present invention, it should be understood by a person with ordinary skill in the art that the manufacturer, grade or quality level and so forth of the devices, equipment and chemicals used in the present invention can be modified without deviating from the claims.

BRIEF DESCRIPTION OF THE REFERENCE SYMBOLS

1 Nickel composite hydroxide
2 Basic substance
3 Element such as cobalt
4. Coating layer

The invention claimed is:

1. A positive electrode active material containing a nickel composite hydroxide in which aluminum and ytterbium are at least partially solid-dissolved in nickel hydroxide,
wherein the nickel composite hydroxide is represented by the following formula (I):

$$Ni_aAl_bYb_c(OH)_d \qquad (I)$$

(wherein,
$a+b+c=1.00$,
$0.70 \leq a < 1.00$,
$0 < b \leq 0.2$,
$0.05 \leq c \leq 0.1$, and
$d = 2a+3b+3c$).

2. The positive electrode active material according to claim 1, wherein the nickel composite hydroxide further contains a coating layer with which it is covered, and the coating layer contains cobalt.

3. The positive electrode active material according to claim 2, wherein the coating layer further contains at least one type of element selected from the group consisting of aluminum, manganese and nickel.

4. The positive electrode active material according to claim 3, wherein the coating layer contains manganese and nickel.

5. A positive electrode containing the positive electrode active material according to claim 1.

6. An alkaline battery containing the positive electrode according to claim 5.

* * * * *